United States Patent
Pehlke

(10) Patent No.: US 12,289,125 B2
(45) Date of Patent: Apr. 29, 2025

(54) EMISSIONS-SUPPRESSION CIRCUITS

(71) Applicant: SKYWORKS SOLUTIONS, INC., Irvine, CA (US)

(72) Inventor: David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 18/312,890

(22) Filed: May 5, 2023

(65) Prior Publication Data

US 2023/0275608 A1    Aug. 31, 2023

Related U.S. Application Data

(63) Continuation of application No. 17/086,346, filed on Oct. 31, 2020, now Pat. No. 11,646,757.

(60) Provisional application No. 62/929,664, filed on Nov. 1, 2019.

(51) Int. Cl.
*H04B 1/10* (2006.01)
*H04B 1/00* (2006.01)

(52) U.S. Cl.
CPC ......... *H04B 1/1036* (2013.01); *H04B 1/0057* (2013.01); *H04B 1/006* (2013.01); *H04B 2001/1063* (2013.01)

(58) Field of Classification Search
CPC .... H04B 1/1036; H04B 1/0057; H04B 1/006; H04B 2001/1063; H04B 15/00
USPC ........................................................ 375/307
See application file for complete search history.

(56) References Cited

U.S. PATENT DOCUMENTS

| | | |
|---|---|---|
| 6,181,208 B1 | 1/2001 | King et al. |
| 6,359,514 B1 | 3/2002 | King et al. |
| 6,472,935 B2 | 10/2002 | King et al. |
| 6,782,208 B1 | 8/2004 | Lundholm et al. |
| 8,638,819 B2 | 1/2014 | Chen et al. |
| 9,572,052 B2 | 2/2017 | King et al. |
| 9,991,918 B2 | 6/2018 | King et al. |
| 10,014,889 B2 | 7/2018 | King et al. |
| 10,340,961 B2 | 7/2019 | King et al. |
| 10,669,615 B2 | 6/2020 | Wiesner |
| 2002/0090974 A1 | 7/2002 | Hagn |
| 2004/0052272 A1 | 3/2004 | Frank |

(Continued)

FOREIGN PATENT DOCUMENTS

| | | |
|---|---|---|
| CN | 1574705 A | 2/2005 |
| CN | 102036430 B | 5/2014 |
| JP | 2010147589 A | 7/2010 |

OTHER PUBLICATIONS

Final Rejection for U.S. Appl. No. 17/086,346 dated Feb. 17, 2022, 15 pages.

(Continued)

*Primary Examiner* — Tanmay K Shah
(74) *Attorney, Agent, or Firm* — Chang & Hale LLP

(57) ABSTRACT

Architectures and techniques relate to selectively implementing certain components to filter emissions. For example, a circuit can include a filter associated with a first frequency range, a first switch, and a second switch. The first switch can be configured to, in a filter state, route a signal through the filter and configured to, in a bypass state, route the signal to an output node while bypassing the filter. The second switch can be configured to, in the filter state, route the signal from the filter to the output node.

16 Claims, 8 Drawing Sheets

(56) References Cited

U.S. PATENT DOCUMENTS

| | | |
|---|---|---|
| 2005/0008371 A1 | 1/2005 | Lundholm et al. |
| 2005/0208918 A1 | 9/2005 | Rowe et al. |
| 2008/0278136 A1 | 11/2008 | Murtojarvi |
| 2010/0040178 A1 | 2/2010 | Sutton et al. |
| 2010/0105340 A1 | 4/2010 | Weissman |
| 2010/0128689 A1 | 5/2010 | Yoon et al. |
| 2011/0075593 A1 | 3/2011 | Chen et al. |
| 2012/0231751 A1 | 9/2012 | Oka et al. |
| 2013/0065541 A1 | 3/2013 | Lum et al. |
| 2013/0165132 A1 | 6/2013 | Goedken et al. |
| 2013/0217341 A1 | 8/2013 | Jones et al. |
| 2013/0250819 A1 | 9/2013 | Khlat et al. |
| 2013/0271221 A1 | 10/2013 | Levesque et al. |
| 2013/0273859 A1 | 10/2013 | King et al. |
| 2014/0211742 A1 | 7/2014 | Kim et al. |
| 2014/0313947 A1* | 10/2014 | Ali-Ahmad ............... H04L 5/18 370/278 |
| 2015/0133067 A1 | 5/2015 | Chang et al. |
| 2015/0351054 A1* | 12/2015 | Immonen ............ H04W 52/243 370/311 |
| 2016/0044677 A1 | 2/2016 | King et al. |
| 2019/0158134 A1 | 5/2019 | Fresno |
| 2019/0181890 A1 | 6/2019 | Schmidhammer et al. |
| 2021/0067186 A1* | 3/2021 | Beaudin ................. H04B 1/401 |

OTHER PUBLICATIONS

International Search Report dated Dec. 31, 2015 for International Application No. PCT/US2015/044364 filed Aug. 7, 2015, 2 pages.
Non-Final Rejection for U.S. Appl. No. 17/086,346 dated Aug. 4, 2021, 14 pages.
Non-Final Rejection for U.S. Appl. No. 17/086,346 dated May 25, 2022, 10 pages.
Notice of Allowance for U.S. Appl. No. 17/086,346 dated Dec. 23, 2022, 5 pages.
Notice of Allowance for U.S. Appl. No. 17/086,346 dated Feb. 21, 2023, 2 pages.
U.S. Appl. No. 62/034,924, filed Aug. 8, 2014, 14 pages.
U.S. Appl. No. 62/038,111, filed Aug. 15, 2014, 29 pages.
Written Opinion dated Dec. 31, 2015 for International Application No. PCT/US2015/044364, filed Aug. 7, 2015, 9 pages.

* cited by examiner

EMISSIONS-SUPPRESSION CIRCUITS

CROSS-REFERENCE TO RELATED APPLICATIONS

This application is a continuation of U.S. patent application Ser. No. 17/086,346, filed Oct. 31, 2020, and entitled "Notch Filters for Selective Emissions Suppression," which claims priority to U.S. Provisional Application No. 62/929,664, filed Nov. 1, 2019, and entitled "Notch Filters for Selective Emissions Suppression," the entire contents of these are incorporated herein by reference.

BACKGROUND

Field

The present disclosure relates to filter and switch circuits.

Description of the Related Art

Radio-frequency devices are occasionally required to implement higher performance characteristics, which can include lowering emissions, for protection of neighboring receivers, for public safety considerations, and for a variety of other reasons. Such higher performance characteristics are often referred to as intermittent operating characteristics. The intermittent operating characteristics can be required when a radio-frequency device enters a particular geographical area or cellular operator, a network signals such use, or otherwise.

SUMMARY

In accordance with some implementations, the present disclosure relates to an emissions-suppression circuit comprising a notch filter associated with a first frequency range, a switch assembly coupled to the notch filter and configured to, in a filter state, couple the notch filter to a transmit path and configured to, in a bypass state, decouple the notch filter from the transmit path, and a duplexer coupled to the switch assembly. The transmit path is associated with two or more switch connections in the notch-filter state and is associated with one switch connection in the bypass state. The duplexer includes a transmit filter that is associated with a second frequency range.

In some embodiments, the first frequency range is associated with a public safety frequency band and the notch filter is configured to implement a specification associated with the public safety frequency band. Further, in some embodiments, the first frequency range is about 769 MHz to 775 MHz and the second frequency range is about 777 MHz to 787 MHz.

In some embodiments, the duplexer includes a receive filter, the transmit filter and the receive filter are associated with a same frequency band. Further, in some embodiments, the two or more switch connections and the one switch connection are each a connection associated with a switch.

In some embodiments, the switch assembly includes an input node, a first filter node coupled to the notch filter, a second filter node coupled to the notch filter, an output node, a first switch, and a second switch. The switch assembly can be configured to, in the filter state, control the first switch to couple the input node to the first filter node and control the second switch to couple the output node to the second filter node. The switch assembly can be configured to, in the bypass state, control the first switch to couple the input node to the output node.

In some embodiments, the switch assembly includes a single-pole-double-throw switch and a single-pole-single-throw switch. The switch assembly can be configured to, in the bypass state, control the single-pole-double-throw switch to bypass the notch filter and the single-pole-single-throw switch. The single-pole-double-throw switch can be configured to couple to a power amplifier and the duplexer can be configured to couple to an antenna.

In accordance with some implementations, the present disclosure relates to a radio-frequency module comprising a packaging substrate, a first filter implemented on the packaging substrate and configured to attenuate signals associated with one or more frequencies, a switch assembly implemented on the packaging substrate and coupled to the first filter, and a second filter implemented on the packaging substrate and coupled to the switch assembly. The switch assembly includes a first switch and a second switch. The switch assembly is configured to selectively couple the first filter and the second switch to a transmit path.

In some embodiments, the one or more frequencies are associated with a public safety frequency band and the first filter is configured to implement a specification associated with the public safety frequency band. Further, in some embodiments, the first filter is configured to attenuate signals associated with a first frequency range and the second filter is configured to pass signals associated with a second frequency range that is adjacent to the first frequency range. Moreover, in some embodiments, the second filter is a transmit filter that is implemented in a duplexer. The duplexer can include a receive filter that is associated with a same frequency band as the transmit filter.

In some embodiments, the switch assembly includes an input node, a first filter node coupled to the first filter, a second filter node coupled to the first filter, and an output node coupled to the second filter. In a filter state, the first switch can couple the input node to the first filter node and the second switch can couple the output node to the second filter node, and, in a bypass state, the first switch can couple the input node to the output node.

In some embodiments, the switch assembly is configured to operate in a filter state in which the first switch and the second switch are coupled to a transmit path and to operate in a bypass state in which the first switch is coupled to the transmit path and the second switch is decoupled from the transmit path. Further, in some embodiments, the first switch includes a single-pole-double-throw switch and the second switch includes a single-pole-single-throw switch.

In accordance with some implementations, the present disclosure relates to a radio-frequency device comprising a power amplifier, a notch filter, a switch assembly coupled to the power amplifier and the notch filter, a controller coupled to the switch assembly and configured to provide a control signal to the switch assembly, a duplexer coupled to the switch assembly, and an antenna coupled to the duplexer. The switch assembly is configured to, in a filter state, couple the notch filter to a transmit path and is configured to, in a bypass state, decouple the notch filter from the transmit path. The transmit path is associated with two or more switch connections in the filter state and is associated with one switch connection in the bypass state.

In some embodiments, the notch filter is associated with a first frequency range and the duplexer includes a transmit filter that is associated with a second frequency range that is adjacent to the first frequency range. Further, in some embodiments, the switch assembly includes an input node, a first filter node coupled to the notch filter, a second filter node coupled to the notch filter, an output node, a first switch, and a second switch. The switch assembly can be configured to, in the filter state, control the first switch to couple the input node to the first filter node and control the second switch to couple the output node to the second filter node. The switch assembly can be configured to, in the bypass state, control the first switch to couple the input node to the output node.

In some embodiments, the notch filter is associated with a public safety frequency band.

In accordance with some implementations, the present disclosure relates to a circuit comprising a switch assembly, a notch filter coupled between the first filter node and the second filter node, and a transmit filter coupled to the output node. The switch assembly includes an input node, a first filter node, a second filter node, and an output node. The switch assembly is configured to, in a filter state, couple the input node to the first filter node and couple the second filter node to the output node and configured to, in a bypass state, couple the input node to the output node.

For purposes of summarizing the disclosure, certain aspects, advantages, and/or features of the disclosure have been described. It is to be understood that not necessarily all such advantages may be achieved in accordance with any particular embodiment of the disclosure. Thus, the disclosure may be embodied or carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes and should in no way be interpreted as limiting the scope of the disclosure. In addition, various features of different disclosed embodiments can be combined to form additional embodiments, which are part of this disclosure. Throughout the drawings, reference numbers may be reused to indicate correspondence between reference elements.

DETAILED DESCRIPTION

Figure 1:
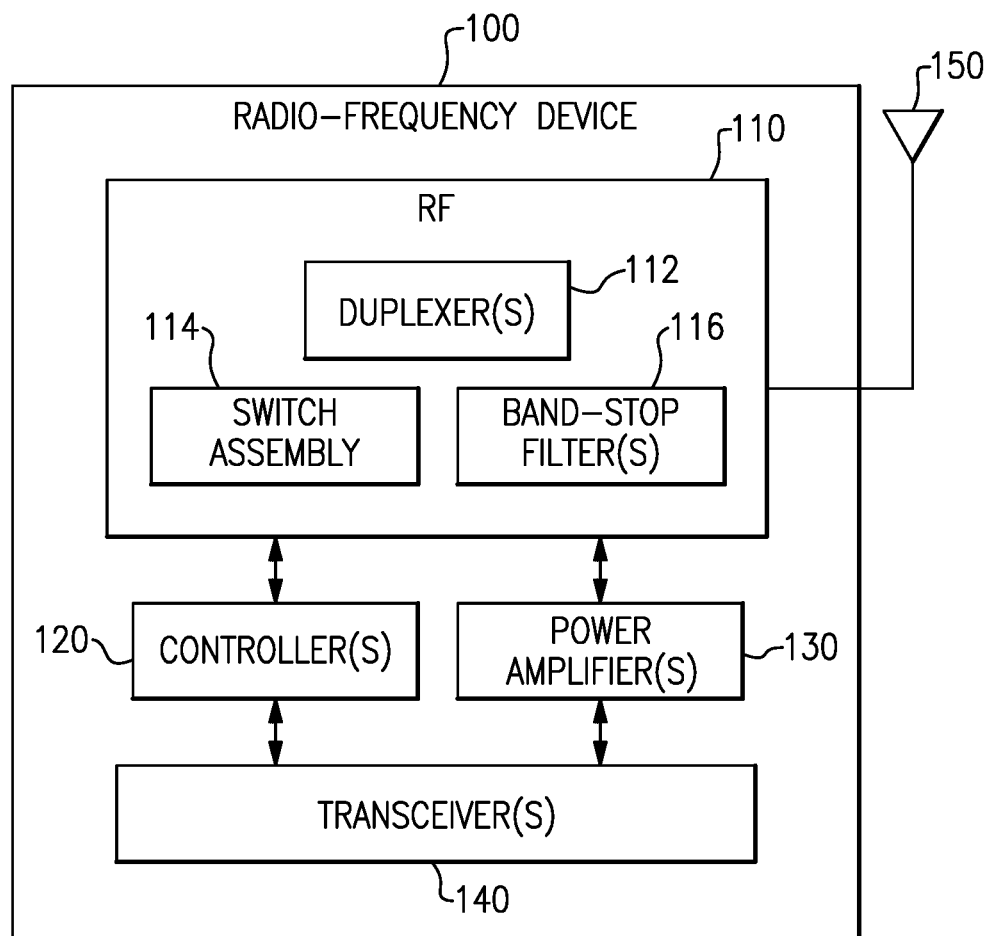
FIG. 1 illustrates an example radio-frequency device having various features relevant to certain aspects of the present disclosure.

As noted above, radio-frequency devices are occasionally required to implement intermittent operating characteristics. In order to achieve the intermittent operating characteristics, certain solutions rely on stronger attenuation of in-line transmit filtering and/or higher power amplifier linearity. These solutions suffer from several performance inefficiencies, such as a lower DC current efficiency, higher insertion losses, and so on. In many solutions, these inefficiencies are imposed all the time, penalizing nominal operating conditions. Since the situations requiring the intermittent operating characteristics are rare, radio-frequency devices often suffer from sub-optimal performance during typical operation.

This disclosure is directed to architectures and techniques that selectively implement certain components to suppress emissions. For example, the architectures and techniques can implement a notch filter and/or other components within a transmit path to reduce emissions when intermittent operating characteristics are desired and bypass the notch filter and/or other components when nominal operating characteristics are desired. The notch filter can be configured to attenuate particular frequency components of a signal to prevent the signal from interfering with communications in a neighboring frequency range, such as another signal within a neighboring frequency band. In some embodiments, in a state where the notch filter is coupled to the transmit path, the transmit path can be associated with two or more switch connections. While in a state where the notch filter is decoupled from the transmit path, the transmit path can be associated with one switch connection. In some embodiments, the notch filter can be positioned between a power amplifier and a duplexer, with a switch assembly coupled to selectively place the notch filter within the transmit path.

In some embodiments, the architectures and techniques discussed herein can avoid or reduce performance inefficiencies that are often associated with emissions suppression. For example, the architectures and techniques can be associated with no (or minimal) performance loss (e.g., insertion loss) during normal operation (e.g., when the notch filter is bypassed using one switch connection) and minimal (or no) performance loss during intermittent operation (e.g., when the notch filter is implemented using two or more switch connections). Further, in some embodiments, by selectively implementing a notch filter, any potential losses associated with the notch filter can be incurred just when the notch filter is implemented. Moreover, in some embodiments, the architectures and techniques can isolate a notch filter from a receive path (and avoid any impact on the receive path) by positioning the notch filter in a transmit path after a power amplifier and/or before a duplexer. Furthermore, in some embodiments, the architectures and techniques can co-package a notch filter with another component, such as a duplexer (and/or power amplifier), which can provide an optimal size for an emissions-suppression system, optimal connectivity for the emissions-suppression system, and/or a highly integrated system/module. Additionally, in some embodiments, the architectures and techniques can selectively implement a notch filter in an efficient manner that avoids use of complex duplexers or other complex filter configurations to manage emissions.

The architectures and techniques discussed herein can be applied to a variety of contexts. In some embodiments, the architectures and techniques selectively implement a notch filter to lower emissions of a signal to avoid interference with communications in a public safety frequency band. However, the architectures and techniques discussed herein can be applied to a variety of other contexts, some of which are described in further detail below. For example, the architectures and techniques can be applied in any implementation where a different performance characteristic is desired intermittently.

FIG. 1 illustrates an example radio-frequency device 100 having various features relevant to certain aspects of the present disclosure. The radio-frequency device 100 includes an RF module 110, a controller(s) 120, a power amplifier (PA) 130, a transceiver(s) 140, and an antenna(s) 150. The transceiver(s) 140 can be configured to convert between analog signals and digital signals. The transceiver(s) 140 can include a digital-to-analog converter, an analog-to-digital converter, a local oscillator for modulating or demodulating a baseband signal to or from a carrier frequency, a baseband processor that converts between digital samples and data bits (e.g., voice or other types of data), and/or other components. The RF module 110 can perform processing on a signal received from the antenna(s) 150 or received from the transceiver 140. In some embodiments, the RF module 110 can be referred to as a front-end module (FEM), which can be physically close to the antenna(s) 150 (e.g., to reduce attenuation due to cable loss). The controller(s) 120 can communicate with the transceiver(s) 140 and/or the RF module 110 to facilitate various functionality discussed herein. Although the controller(s) 120 and/or the PA(s) 130 are illustrated as separate components from the RF module 110, in some embodiments the controller(s) 120 and/or the PA(s) 130 are part of the RF module 110.

The RF module 110 can include a duplexer(s) 112, a switch assembly 114, and/or a band-stop filter(s) 116. The duplexer 112, the switch assembly 114, the band-stop filter(s) 116, and/or other components discussed herein can be coupled to each other in a variety of manners, such as through a conductive path(s) that can include a cable, a trace, a wire, or any other conductive path/material. Although the duplexer(s) 112, the switch assembly 114, and the band-stop filter(s) 116 are illustrated as being implemented on the same RF module 110, one or more of these components can be implemented on separate RF modules. Further, although not illustrated in FIG. 1, the RF module 110 can also include other components, such as attenuators, matching circuits, multiplexers, and so on.

The duplexer(s) 112 can be configured to allow transmit and/or receive operations to be performed simultaneously using a common antenna, such as the antenna(s) 150. The duplexer(s) 112 can include one or more transmit (Tx) filters that are configured to support one or more transmit frequency bands and/or one or more receive (Rx) filters that are configured to support one or more receive frequency bands. For example, the duplexer(s) 112 can include a Tx filter that is configured to receive a signal from the switch assembly 114, filter the signal, and transmit the filtered signal to the antenna(s) 150. Additionally, or alternatively, the duplexer(s) 112 can include an Rx filter that is configured to receive a signal from the antenna(s) 150, filter the signal, and transmit the filtered signal to another component of the radio-frequency device 100, such as one or more components of a receive path. In some embodiments, the duplexer(s) 112 is implemented as a nominal-performance duplexer that is generally configured for normal operation, even though the duplexer(s) 112 can be used in combination with the band-stop filter(s) 116 when the band-stop filter(s) 116 is implemented during intermittent operation, as discussed in further detail below.

The switch assembly 114 can be configured to route one or more signals between components of the RF module 110. For example, the switch assembly 114 can be configured to selectively couple the band-stop filter(s) 116 to a transmit path, such as to the duplexer(s) 112, to implement one or more intermittent operating characteristics. In some embodiments, the switch assembly 114 is coupled between the power amplifier(s) 130 and the duplexer(s) 112, while in other embodiments the switch assembly 114 is positioned elsewhere. The switch assembly 114 can include one or more switches configured to implement one or more switch connections. For example, a switch can include an arm that is configured to be placed in an on state (e.g., conducting state) or off state (e.g., non-conducting state). When the switch is placed in an on state, the switch can form a switch connection between a first node (e.g., a pole) and a second node (e.g., a throw). In some embodiments, the switch assembly 114 bypasses a switch, as discussed in further detail below in reference to FIG. 2. A switch can include a transistor(s), a mechanical switch(s), or any other switch, and/or can include any number of throws/poles.

The band-stop filter(s) 116 can include one or more filters configured to filter a signal. For example, the band-stop filter(s) 116 can be configured to attenuate signals of a frequency(ies) or within a frequency range and/or pass signals outside the frequency or frequency range. The band-stop filter(s) 116 can be configured to attenuate a signal by a particular amount, to below a threshold, and so on. In some embodiments, the band-stop filter(s) 116 can be coupled to a transmit path when one or more intermittent operating characteristics are desired, such as when lower emissions are desired (in comparison to a normal operating mode). In some embodiments the band-stop filter(s) 116 is implemented as a notch filter with a relatively narrow stop band (e.g., a frequency range that is less than a particular amount).

The controller(s) 120 can be configured to manage, at least in part, an operating mode of the RF module 110 and/or the radio-frequency device 100. For example, the controller(s) 120 can determine/control a transmission mode for operation of the RF module 110 and/or the radio-frequency device 100, such as a nominal mode (also referred to as a "normal operating mode") or an intermittent mode. For instance, the controller(s) 120 can generally control the RF module 110 and/or the radio-frequency device 100 to operate in the nominal mode, and switch to the intermittent mode when one or more conditions are satisfied, such as receiving a signal from a device within a cellular network to enter the intermittent mode (e.g., a network signaling case), determining that the radio-frequency device 100 is within a particular geographical region or cellular operator, determining that the radio-frequency device 100 is about to transmit a communication on a frequency band that is adjacent to a public safety frequency band, determining that another device within communication range to the radio-frequency device 100 is using a public safety frequency band for communication, determining that the radio-frequency device 100 is transmitting or about to transmit communications in adjacent frequency bands, determining that harmonic distortion or intermodulation distortion of a signal may interfere with another signal, determining that there is more than a threshold amount of interference in an environment where the radio-frequency device 100 is located, and so on. In response to entering the intermittent mode, the controller(s) 120 can send a control signal to the switch assembly 114 to enable the band-stop filter(s) 116 (e.g., couple the band-stop filter(s) 116 to the transmit or receive path). The controller(s) 120 can switch back to the nominal mode when the one or more conditions are not satisfied anymore and/or when one or more other conditions are satisfied. When the controller(s) 120 determines to transition back to the nominal mode, the controller(s) 120 can send a control signal to the switch assembly 114 to disable the band-stop filter(s) 116 (e.g., decouple the band-stop filter(s) 116 from the transmit or receive path).

When operating in the nominal mode, the radio-frequency device 100 can be associated with one or more nominal operating characteristics. In some embodiments, a nominal specification defines one or more nominal operating characteristics (also referred to as "one or more nominal operating parameters"). For example, the radio-frequency device 100 can operate in the nominal mode (and implement one or more nominal operating characteristics) to meet a nominal specification. Further, when operating in the intermittent mode, the radio-frequency device 100 can be associated with one or more intermittent operating characteristics. In some embodiments, an intermittent specification defines one or more intermittent operating characteristics (also referred to as "one or more intermittent operating parameters"). For example, the radio-frequency device 100 can operate in the intermittent mode (and implement one or more intermittent operating characteristics) to meet an intermittent specification. In some embodiments, an intermittent specification can include a signaling specification associated with a public safety frequency band, such as a signaling specification associated with the 700 MHz or 800 MHz public safety frequency band(s). An operating characteristic, such as a nominal operating characteristic or an intermittent operating characteristic, can include linearity, emissions, power level, modulation quality, and so on. Further, a specification, such as a nominal operating specification or an intermittent operating specification, can define an amount, level, threshold, or any value for an operating characteristic. In some embodiments, an intermittent operating characteristic is different and/or stricter than a nominal operating characteristic. For example, an intermittent specification can require lower emissions than a nominal specification.

In one non-limiting example of implementing different operating modes, the radio-frequency device 100 can implement a nominal specification during normal operation and implement an intermittent specification associated with a public safety frequency band when the radio-frequency device 100 is communicating within a frequency band that is adjacent to the public safety frequency band and the intermittent specification is requested. For instance, the RF module 110 can be configured to implement the NS_07 specification associated with the public safety band from 769 MHz to 775 MHz (sometimes referred to as "the NS_07 public safety band") in certain instances to avoid interference with the NS_07 public safety band. The NS_07 specification can require the radio-frequency device 100 to lower its emissions to meet a spectrum emission of a particular amount (e.g., less than −57 dBm/6.25 kHz) at an antenna in the NS_07 public safety band. As such, the band-stop filter 116 can be configured to attenuate signals associated with the NS_07 public safety band (e.g., signals within a range of about 769 MHz to 775 MHz). Here, if the RF module 110 desires to communicate within the transmit band of Band 13 (777-787 MHz), which is adjacent to the NS_07 public safety band, and the NS_07 specification is signaled, the RF module 110 can enter an intermittent operating mode to satisfy the NS_07 specification. In the intermittent operating mode, the RF module 110 can lower transmission emissions within the NS_07 public safety band to below a level specified in the NS_07 specification by implementing the band-stop filter(s) 116 (e.g., coupling the band-stop filter(s) 116 to the transmit path to attenuate frequency components of a Band 13 signal that are within the public safety band).

The controller(s) 120 can also be configured to control other aspects of the RF module 110 and/or the radio-frequency device 100. For example, the controller(s) 120 can send a control signal to the duplexer(s) 112 to control reception and/or transmission of a signal. Further, in some embodiments, the radio-frequency device 100 is configured to implement a plurality of gain modes for different amounts of amplification, and the controller(s) 120 is configured to manage the gain mode that is used. Each gain mode can be associated with a different amount of amplification. For example, the controller(s) 120 can provide a control signal to the RF module 110, the PA(s) 130, a low noise amplifier(s) (LNA(s)), and/or another component indicative of a desired or target gain. In some embodiments, the controller(s) 120 can include control circuitry configured to implement one or more of the operations discussed herein.

The antenna 150 can include one or more primary antennas and/or one or more diversity antennas. A primary antenna and a diversity antenna can be physically spaced apart such that a signal at the primary antenna and the diversity antenna are received with different characteristics. For example, a primary antenna and a diversity antenna can receive the signal with different attenuation, noise, frequency response, and/or phase shift. The transceiver(s) 140 can use both of the signals with different characteristics to determine data bits corresponding to the signal. In some implementations, the transceiver(s) 140 selects between a primary antenna and a diversity antenna based on the characteristics, such as selecting the antenna with the highest signal-to-noise ratio. In some embodiments, the transceiver(s) 140 combines signals from a primary antenna and a diversity antenna to increase the signal-to-noise ratio of the combined signal. In some embodiments, the transceiver(s) 140 processes signals to perform multiple-input/multiple-output (MIMO) communication. As noted above, in some embodiments, the diversity antenna can be physically spaced apart from the primary antenna. Here, the diversity antenna can be coupled to the transceiver(s) 140 by a transmission line, such as a cable, a printed circuit board (PCB) trace, or another component. In examples, the transmission line is lossy and/or attenuates the signal received at the diversity antenna before it reaches the transceiver(s) 140.

Figure 2:
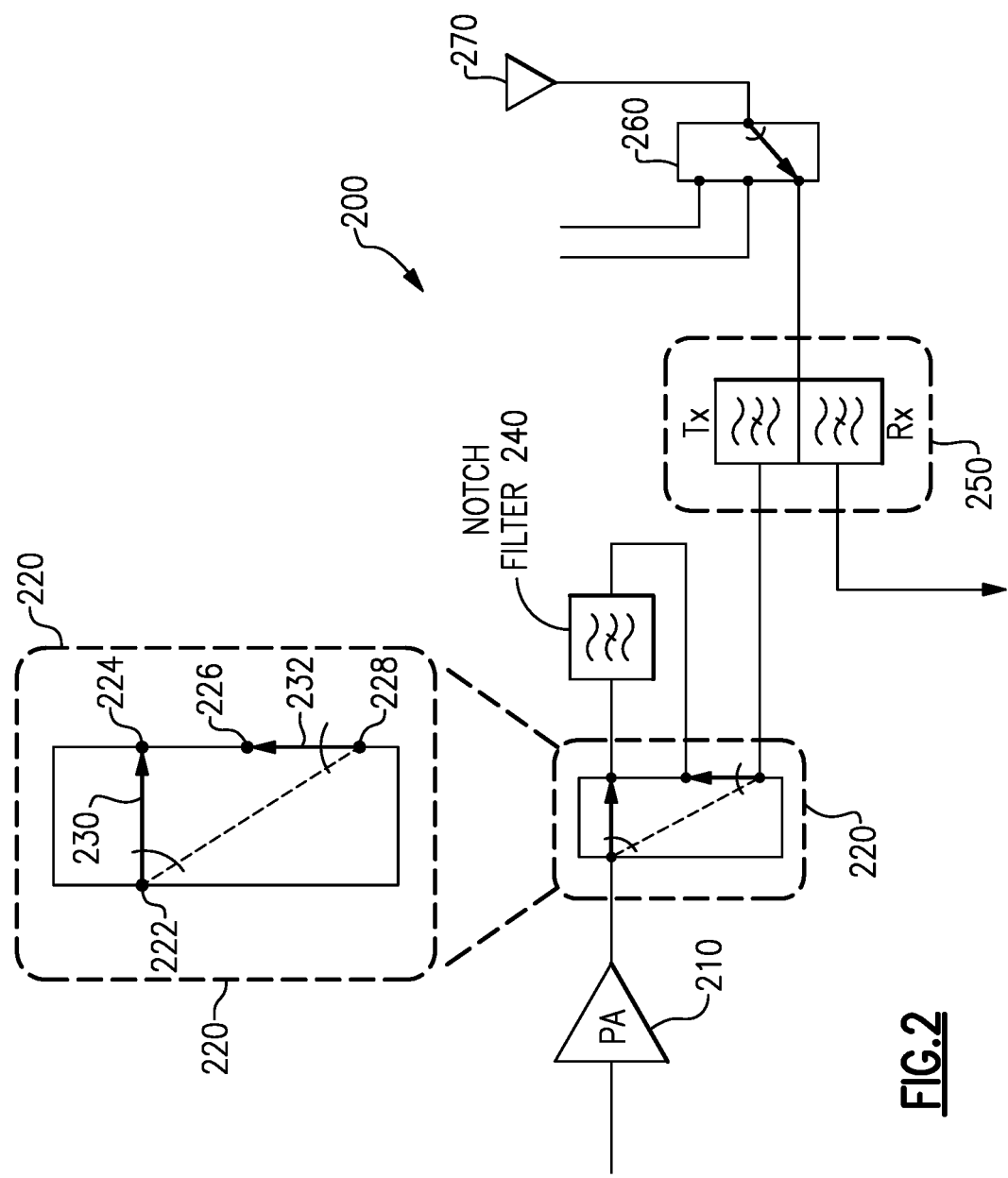
FIG. 2 illustrates an example emissions-suppression system that includes a notch filter that is selectively implemented in accordance with one or more embodiments.

FIG. 2 illustrates an example emissions-suppression system 200 that includes a notch filter 240 that is selectively implemented in accordance with one or more embodiments. The emissions-suppression system 200 includes (i) a power amplifier (PA) 210 coupled to a switch assembly 220, (ii) the switch assembly 220 coupled to the PA 210, the notch filter 240, and a duplexer 250, (iii) the notch filter 240 coupled to the switch assembly 220, (iv) a duplexer 250 coupled to the switch assembly 220 and an antenna switch 260, (v) the antenna switch 260 coupled to the duplexer 250 and an antenna 270, and (vi) the antenna 270 coupled to the antenna switch 260. Here, the switch assembly 220 can be configured to selectively place the notch filter 240 within a transmit path/circuit, which can include the PA 210, the duplexer 250, the antenna switch 260, the antenna 270, and/or other components/circuitry configured to route a transmit signal. In some embodiments, when implemented, the notch filter 240 is placed in series with the PA 210, the duplexer 250, the antenna switch 260, and/or the antenna 270. Although the notch filter 240 is discussed as being implemented in the context of a transmit path/circuit, the notch filter 240 can be implemented in the context of a receive path/circuit or any other path/circuit. In some embodiments, the PA 210, the switch assembly 220, the notch filter 240, and/or the duplexer 250 can be referred to as an emissions-suppression circuit.

In the example of FIG. 2, the switch assembly 220 includes an input node 222 coupled to the PA 210 and configured to receive an input signal from the PA 210, and an output node 228 coupled to the duplexer 250 and configured to provide an output signal to the duplexer 250. The switch assembly 220 also includes a first filter node 224 coupled to the notch filter 240 (e.g., a first connection of the notch filter 240) and a second filter node 226 coupled to the notch filter 240 (e.g., a second connection of the notch filter 240). Further, the switch assembly 220 includes a first switch 230 configured to couple the input node 222 to the first filter node 224 or to couple the input node 222 to the output node 228 (e.g., as a bypass bridge). That is, the first switch 230 can be controlled to provide a conducting path between the input node 222 and the first filter node 224 or to provide a conducting path between the input node 222 and the output node 228. The switch assembly 220 also includes a second switch 232 configured to couple the output node 228 to the second filter node 226 or decouple the output node 228 from the second filter node 226. That is, the second switch 232 can be controlled to provide a conducting path between the output node 228 and the second filter node 226 or prevent a conducting path from being implemented between the output node 228 and the second filter node 226. The first switch 230 and/or the second switch 232 can each be implemented with one or more arms, which can include one or more transistors or other components. In some embodiments, the first switch 230 is implemented as a single-pole-double-throw switch and/or the second switch 232 is implemented as a single-pole-single-throw switch. Although the nodes 222-228 are illustrated as part of the switch assembly 220, the nodes 222-228 can be implemented as separate components outside the switch assembly 220.

The switch assembly 220 can be controlled to couple the notch filter 240 to the transmit path or decouple the notch filter 240 from the transmit path. For example, the first switch 230 and/or the second switch 232 can be controlled to place the switch assembly 220 in a filter state in which the notch filter 240 is coupled to the transmit path or to operate in a bypass state in which the notch filter 240 is decoupled from the transmit path. In particular, in the filter state, the first switch 230 can be controlled to couple the input node 222 to the first filter node 224 and the second switch 232 can be controlled to couple the output node 228 to the second filter node 226. When in the filter state, the switch assembly 220 implements two switch connections (i.e., a connection from the input node 222 to the first filter node 224 and a connection from the output node 228 to the second filter node 226). Further, in the bypass state, the first switch 230 can be controlled to couple the input node 222 directly to the output node 228 and/or the second switch 232 can be controlled to decouple the output node 228 from the second filter node 226. When in the bypass state, the switch assembly 220 implements one switch connection (i.e., a connection from the input node 222 to the output node 228). That is, in the bypass state the switch assembly 220 bypasses the notch filter 240 and the second switch 232. In some embodiments, a controller (not illustrated) can send a signal to the switch assembly 220 to control a state of the switch assembly 220 (e.g., cause the switch assembly 220 to implement the filter state or the bypass state). The switch assembly 220 generally operates in the bypass state when the emissions-suppression system 200 is operating in a nominal (or normal) mode, and generally operates in the filter state when the emissions-suppression system 200 is operating in an intermittent mode.

As noted above, the switch assembly 220 can implement different number of switch connections to use or bypass the notch filter 240. For example, the switch assembly 220 can implement two switch connections to couple the notch filter 240 to the transmit path and implement one switch connection to bypass the notch filter 240. In some embodiments, each switch connection can introduce an amount of loss to a system (sometimes referred to as "insertion loss (IL)"). Each switch connection can refer to an electrical coupling of one node to another node. As such, the emissions-suppression system 200 can enable the notch filter 240 to be selectively implemented while minimizing losses associated with switch connections (e.g., bypassing the switch connection associated with the second switch 232 when the notch filter 240 is not implemented). In some embodiments, the total IL of implementing the notch filter 240 in the transmit path (e.g., coupling the notch filter 240 into the transmit path) is less than 1 dB. Further, in some embodiments, the notch filter 240 can be implemented without impacting the Tx filter of the duplexer 250 and without impacting the Rx filter of the duplexer 250.

Although the example of FIG. 2 discusses the switch assembly 220 with various nodes and switches to selectively implement the notch filter 240, the switch assembly 220 can include a variety of other components and/or the nodes and switches implemented in other manners to selectively implement the notch filter 240.

The duplexer 250 can be configured to allow transmit and/or receive operations to be performed simultaneously. The duplexer 250 can include a transmit (Tx) filter(s) that is configured to support a transmit frequency band(s) and/or a receive (Rx) filter(s) that are configured to support a receive frequency band(s). In some embodiments, the Tx filter and/or the Rx filter of the duplexer 250 support a frequency band that neighbors a frequency band associated with the notch filter 240. As shown, the Tx filter of the duplexer 250 is coupled to the switch assembly 220 and is part of a transmit path for the emissions-suppression system 200. In some embodiments, the Tx filter of the duplexer 250 is a band pass filter that passes signals within a frequency range. In some embodiments, by implementing the notch filter 240 and/or the switch assembly 220 in the transmit path before the duplexer 250, the emissions-suppression system 200 can isolate the notch filter 240 within a portion of the transmit path and/or isolate the notch filter 240 from the receive path (e.g., avoid imputing any potential losses associated with the notch filter 240 in the receive path). For example, the receive path can remain unaffected by the implementation of the notch filter 240.

The antenna switch 260 can be configured to route a signal to and/or from the antenna 270 along one or more of a plurality of paths. In the example of FIG. 2, the antenna switch 260 includes three nodes/connections, so that the antenna 270 can connect to one of the three paths coupled to the three nodes/connections. Here, the antenna switch 260 couples the emissions-suppression circuit to the antenna 270 (e.g., the antenna switch 260 has selected the emissions-suppression circuit). The other two paths can connect to various other components of a radio-frequency device, such as other components associated with receive/transmit paths/circuits. Although the antenna switch 260 is implemented in FIG. 2, in some embodiments the antenna switch 260 can be eliminated and the duplexer 250 can connected directly to the antenna 270.

In some embodiments, by switching-in the notch filter 240 when desired/needed, any potential loss penalty associated with the notch filter 240 is selectively incurred (e.g., not incurred all the time). Further, the notch filter 240 can be quite low loss in-band of the Tx carrier, as it may not require a large number of resonators, and/or can be fairly narrow-band. In some embodiments, the notch filter 240 is tuned for a particular frequency(ies) that require attenuation.

Although a single notch filter 240 is illustrated in FIG. 2, any number of notch filters can be included in an emissions-suppression system. For example, a first notch filter can be implemented in series (or otherwise) with a second notch filter in an emissions-suppression system that includes a duplexer configured to support a transmit frequency range (e.g., the duplexer includes a pass band filter configured to pass frequencies in the transmit frequency range). Here, the first notch filter can be configured to attenuate signals below the transmit frequency range and the second notch filter can be configured to attenuate signals above the transmit frequency range.

The techniques and architectures discussed herein can support a variety of frequency bands. In some embodiments, a notch filter supports a first frequency band associated with a first frequency range and a duplexer supports a second frequency band associated with a second frequency range that is adjacent to the first frequency band (e.g., directly adjacent to the first frequency band or within a number of Hz). As one non-limiting example, a Tx filter of a duplexer can support Band 13 (e.g., pass signals in the 777 MHz to 787 MHz range), while a notch filter can be associated with the NS_07 public safety band (e.g., attenuate signals in the 769 MHz to 775 MHz range) which is adjacent to the transmit Band 13 (e.g., within 2 MHz). That is, the Tx filter of the duplexer can filter signals for Band 13, while the notch filter can attenuate signals to protect the NS_07 public safety band.

The techniques and architectures discussed herein can be applied to a variety of contexts. In some embodiments, the techniques and architectures can be applied to a network signaling case. For example, a cellular standard, such as the Long Term Evolution (LTE) standard, can provide a number of network signaling cases where relatively stringent emissions are imposed on specific RF paths and/or band support in user equipment (UE) in the cellular standard. Such cases include various Network Signaling (NS) cases, which can be for a geographical region to protect local wireless services, for public safety, for covering areas that are occupied geographically by digital television co-existence specifications, etc. Information regarding non-limiting example NS cases is provided below in Table 1. The frequency bands in Table 1 correspond to Evolved Universal Terrestrial Radio Access (E-UTRA) operating bands of the LTE standard. Some of these NS cases are for protecting a victim band. Other NS cases below are related to spectral masks.

TABLE 1

| NS Case | E-UTRA Band | Channel BW [MHz] | Basis for NS | Emissions Type |
|---|---|---|---|---|
| NS_01 | ALL | 1.4, 3, 5, 10, 15, 20 | Spectral Regrowth | Spectral Mask |
| NS_03 | B2, B4, B10, B23, B25, B35, B36 | 3, 5, 10, 15, 20 | US FCC Emissions | Spectral Mask |
| NS_04 | B41 | 5, 10, 15, 20 | US FCC Emissions | Spectral Mask |

TABLE 1-continued

| NS Case | E-UTRA Band | Channel BW [MHz] | Basis for NS | Emissions Type |
|---|---|---|---|---|
| NS_05 | B1 | 10, 15, 20 | PHS Rx | Protect Band |
| NS_06 | B12, B13, B14, B17 | 1.4, 3, 5, 10 | US FCC Emissions | Spectral Mask |
| NS_07 | B13 | 10 | Public Safety | Public Safety |
| NS_08 | B19 | 10, 15 | B18/B19 Rx | |
| NS_09 | B21 | 10, 15 | B11 Rx | Protect Band |
| NS_10 | B20 | 15, 20 | B20 Rx | Protect Band |
| NS_11 | B23 | 1.4, 3, 5, 10, 15, 20 | Block H (B25 Ext Rx) | Protect Band/ Spectral Mask |
| NS_12 | B26 | 1.4, 3, 5, 10, 15 | Public Safety | Protect Band |
| NS_13 | B26 | 5 | Public Safety | Protect Band |
| NS_14 | B26 | 10, 15 | Public Safety | Protect Band |
| NS_15 | B26 | 1.4, 3, 5, 10, 15 | Public Safety | Protect Band |
| NS_16 | B27 | 3, 5, 10 | B28 Rx | Protect Band |
| NS_17 | B28 | 5, 10 | Japan DTV | Protect Band |
| NS_18 | B28 | 5, 10, 15, 20 | DTV | Protect Band |
| NS_19 | B44 | 10, 15, 20 | DTT-TV | Protect Band |
| NS_20 | B23 | 5, 10, 15, 20 | | Protect Band/ Spectral Mask |
| NS_21 | B30 | 10, 15 | SDARS/ XM Radio | Spectral Mask |
| NS_22 | B42/B43 | 1.4, 3, 5, 10, 15 | B43/B42 TDD Rx | Spectral Mask |
| NS_23 | B42/B43 | 5, 10 | B43/B42 TDD Rx | Spectral Mask |

Further, in some embodiments, the techniques and architectures can be applied to cases where there are intermittent emissions amongst radios within a single radio-frequency device. This can be referred to as self-defense coexistence. For example, while a radio-frequency device is facilitating an LIE call in Band 41 (in a frequency range from 2496 MHz to 2690 MHz), a 2.4 GHz Wi-Fi connection can be started (in a frequency range from 2403 MHz to 2483 MHz). In this example, it can be desirable to reduce emissions from the Band 41 transmission into the 2.4 GHz Wi-Fi upper frequency channels. Absent such a reduction in emissions, the radio-frequency device can de-sense its own Wi-Fi reception. As another example, a Band 12 operation can be carrier aggregated with a secondary receive channel in Band 4. The third harmonic of Band 12 is typically not a concern when operating on its own, but with a Band 12 transmit/receive primary channel adding the secondary Band 4 receive channel, it may be desirable to attenuate the third harmonic of Band 12 up to about 100 dB from its amplitude at a power amplifier output (e.g., a collector of a bipolar power amplifier transistor) so it does not interfere with the Band 4 receive path. As a further example, a radio-frequency device operating in Band 13 can have a second harmonic that is near a Global Position System (GPS) frequency band. If GPS is not operating, the suppression of a second harmonic of Band 13 may not be of much concern. However, when GPS is active, filtering out the second harmonic of Band 13 can have a significant impact on improving performance.

Moreover, in some embodiments, the techniques and architectures can be applied to case where there is interference from an environment around a radio-frequency device. For instance, when a radio-frequency device is being used in a crowded environment, radio-frequency devices of other nearby users can cause interference. Alternatively, or additionally, a network interference environment can change, and the radio-frequency device can suddenly be immersed in an interfering situation in a cell. A base station (e.g., an Evolved Node B [eNodeB]) can direct the radio-frequency device to operate with a more stringent specification to better manage a temporary coexistence issue.

Furthermore, in some embodiments, the techniques and architectures can be applied to a case described in U.S. Pat.

No. 9,572,052, entitled "Front End Architecture for Intermittent Emissions and/or Coexistence Specification," patented Feb. 14, 2017, the entire contents of which are incorporated herein by reference.

The techniques and architectures can be applied to various frequency bands and/or ranges. In some embodiments, the techniques and architectures support a frequency band described below in Table 2. As one non-limiting example, the duplexer 250 and/or the notch filter 240 of FIG. 2 can support a frequency band described below in Table 2. However, the duplexer 250, the notch filter 240, or any other component of a radio-frequency device can support various other bands, such as a public safety band, or another band. Although various frequency ranges are shown for the frequency bands below, other frequency ranges than those shown can be used.

TABLE 2

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | SDL | | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

Figure 3A:
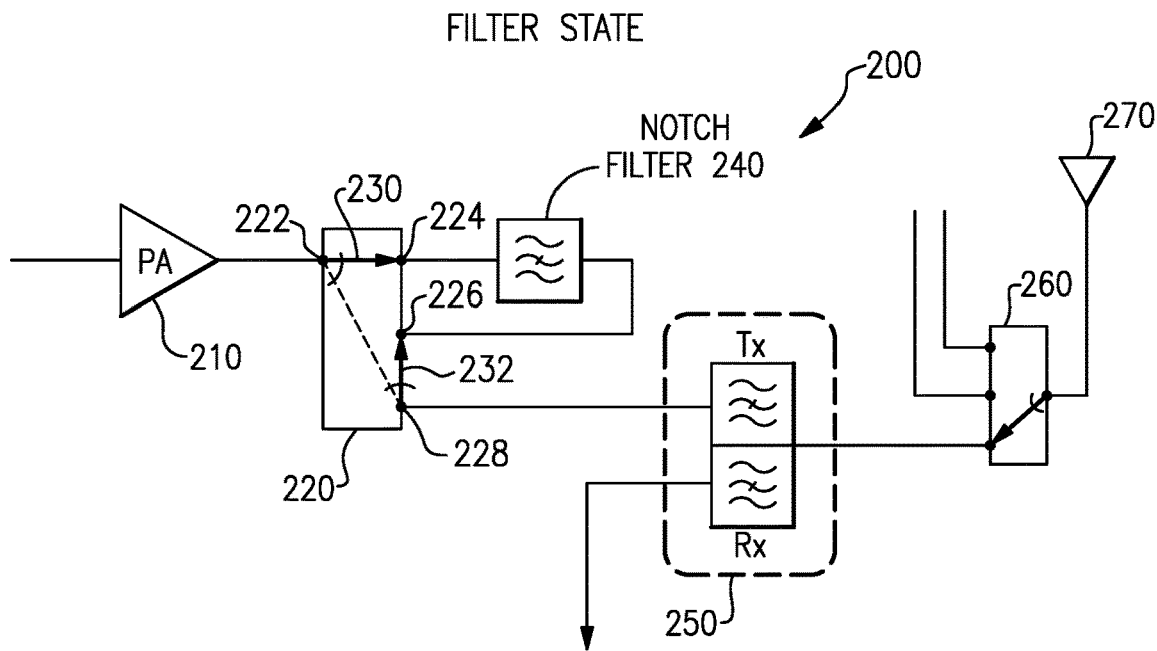
FIGS. 3A-3B illustrate example configurations of the emissions-suppression system of FIG. 2 for multiple states in accordance with one or more embodiments.
Figure 3B:
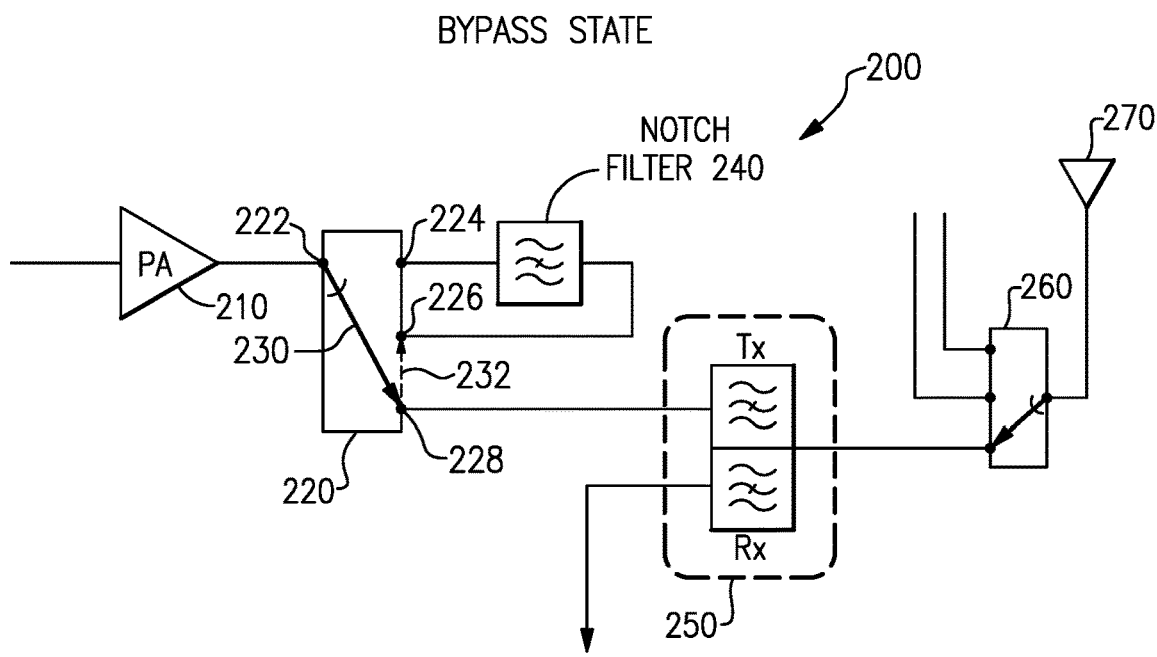

FIGS. 3A-3B3 illustrate example configurations of the emissions-suppression system 200 of FIG. 2 for multiple states in accordance with one or more embodiments. In particular, FIG. 3A illustrates the emissions-suppression system 200 in a filter state where the notch filter 240 is coupled to a transmit path. Here, the first switch 230 couples the input node 222 to the first filter node 224 and the second switch 232 couples the output node 228 to the second filter node 226. In contrast, FIG. 3B illustrates the emissions-suppression system 200 in a bypass state where the notch filter 240 is decoupled from the transmit path. Here, the first switch 230 couples the input node 222 to the output node 228 and the second switch 232 decouples the output node 228 from the second filter node 226. As shown, the notch filter 240 is bypassed along with the second switch 232 (e.g., the second connection).

Figure 4:
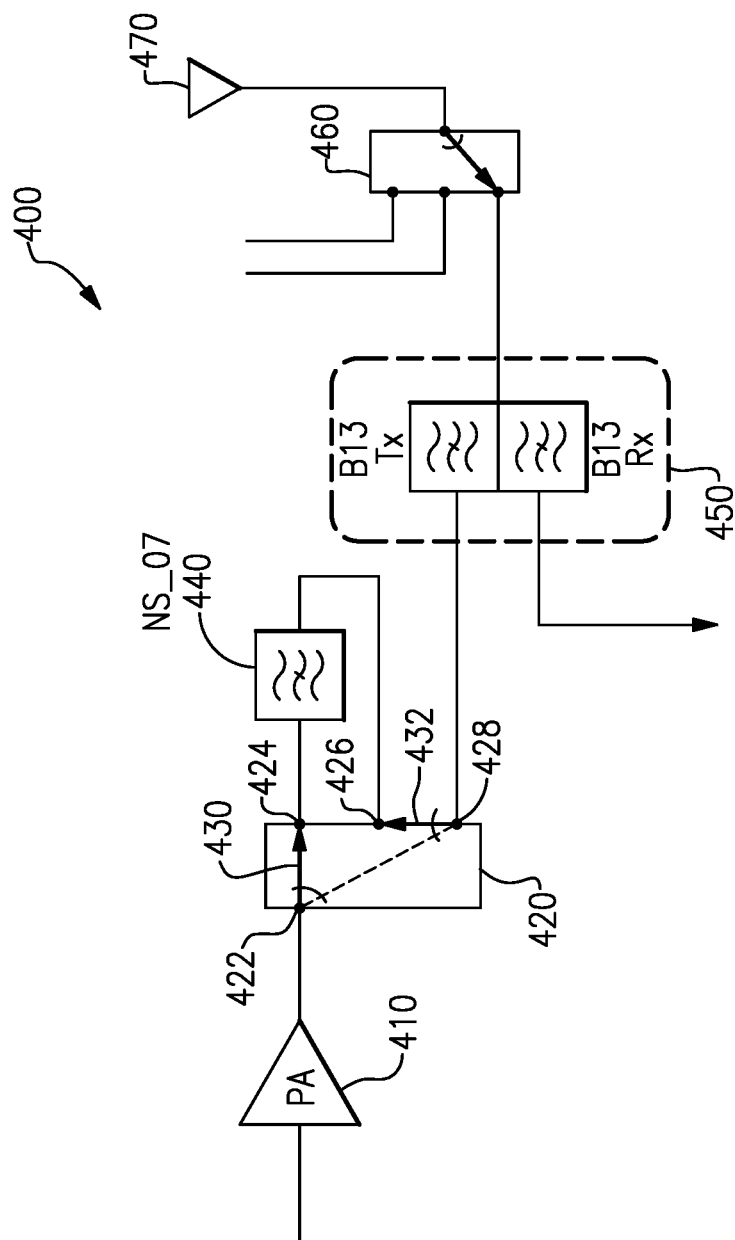
FIG. 4 illustrates an example emissions-suppression system that includes an NS_07 notch filter that is selectively implemented in accordance with one or more embodiments.

FIG. 4 illustrates an example emissions-suppression system 400 that includes an NS_07 notch filter 440 that is selectively implemented in accordance with one or more embodiments. In some embodiments, the emissions-suppression system 400 illustrates an example of the emissions-suppression system 200 of FIG. 2 with the notch filter 240 implemented as the NS_07 notch filter 440 associated with a NS_07 public safety band and the duplexer 250 implemented as a duplexer 450 associated with a Band 13. However, the emissions-suppression system 400 can be implemented in other contexts. The emissions-suppression system 400 illustrates one non-limiting example that can be implemented. That is, although the notch filter 440 is illustrated in the context of being associated with the NS_07 public safety band and the duplexer 450 is illustrated in the context of being associated with Band 13, the emissions-suppression system 400 can be implemented to support a variety of other frequency bands.

As shown, the emissions-suppression system 400 includes (i) a power amplifier (PA) 410 coupled to a switch assembly 420, (ii) the switch assembly 420 coupled to the PA 410, the notch filter 440, and the duplexer 450, (iii) the notch filter 440 coupled to the switch assembly 420, (iv) the duplexer 450 coupled to the switch assembly 420 and an antenna switch 460, (v) an antenna switch 460 coupled to the duplexer 450 and an antenna 470, and (vi) an antenna 470 coupled to the antenna switch 460. Here, the switch assembly 420 can be configured to selectively place the NS_07 notch filter 440 within a transmit path/circuit, which can include the PA 410, the duplexer 450, the antenna switch 460, and/or the antenna 470. Although the NS_07 notch filter 440 is discussed as being implemented in the context of a transmit path/circuit, the NS_07 notch filter 440 can be implemented in the context of a receive path/circuit or any other path/circuit.

In the example of FIG. 4, the switch assembly 420 includes an input node 422 coupled to the PA 410 and configured to receive an input signal from the PA 410, and an output node 428 coupled to the duplexer 450 and configured to provide an output signal to the duplexer 450. The switch assembly 420 also includes a first filter node 424 coupled to the notch filter 440 (e.g., a first connection of the notch filter 440), a second filter node 426 coupled to the notch filter 440 (e.g., a second connection of the notch filter 440). Further, the switch assembly 420 includes a first switch 430 configured to couple the input node 422 to the first filter node 424 or to couple the input node 422 to the output node 428. The switch assembly 420 also includes a second switch 432 configured to couple the output node 428 to the second filter node 426 or decouple the output node 428 from the second filter node 426.

The emissions-suppression system 400 can be configured to implement an NS_07 specification, when signaled, to avoid interference with the NS_07 public safety band. For example, the NS_07 notch filter 440 can be configured to attenuate signals that are around 775 MHz (or within a frequency range centered around 775 MHz) by a particular amount or below a threshold. As such, when a Band 13 signal is scheduled to be transmitted, and the NS_07 specification is signaled, the emissions-suppression system 400 can couple the NS_07 notch filter 440 to the transmit path to attenuate particular frequency components of the Band 13 signal. In particular, when the Band 13 signal is received at the switch assembly 420 from the PA 410, the switch assembly 420 can route the Band 13 signal to the NS_07 notch filter 440. The NS_07 notch filter 440 can remove/ attenuate portions of the Band 13 signal that are around 775 MHz (or within a frequency range centered around 775 MHz). The switch assembly 420 can then route the filtered Band 13 signal to the duplexer 450. The duplexer 450 can be configured as a pass band filter to perform filtering for Band 13 (e.g., the Tx filter can be a band pass filter that passes signals within the frequency range of about 777 MHz to 787 MHz). Thus, the filtered Band 13 signal that is passed to the antenna 470 can be relatively free of components that would interfere with the NS_07 public safety band. As such, the emissions-suppression system 400 can avoid transmitting signals that interfere with the public safety band NS_07.

In some embodiments, the NS_07 notch filter 440 is implemented to remove signal components that may not otherwise be removed by the Tx filter of the duplexer 450. For example, the Tx filter of the duplexer 450 may be a band pass filter that does not have a sharp cut off at the edges of the pass band. Thus, the Tx filter of the duplexer 450 may not be able to remove frequency components that are relatively close to ends of the pass band frequency range. For instance, signal components that are close to 777 MHz and 787 MHz, such as a signal component at 775 MHz, may still pass through the Tx filter of the duplexer 450, even if attenuated to some degree. Thus, the NS_07 notch filter 440 can be implemented (e.g., with a relatively narrow stop-band and a largest attenuation at about 775 MHz, for example) to assist in removing/attenuating undesired frequency components that are relatively close to an end(s) of the frequency range of the Tx filter of the duplexer 450. For example, the NS_07 notch filter 440 can remove frequency components around 775 MHz.

Figure 5:
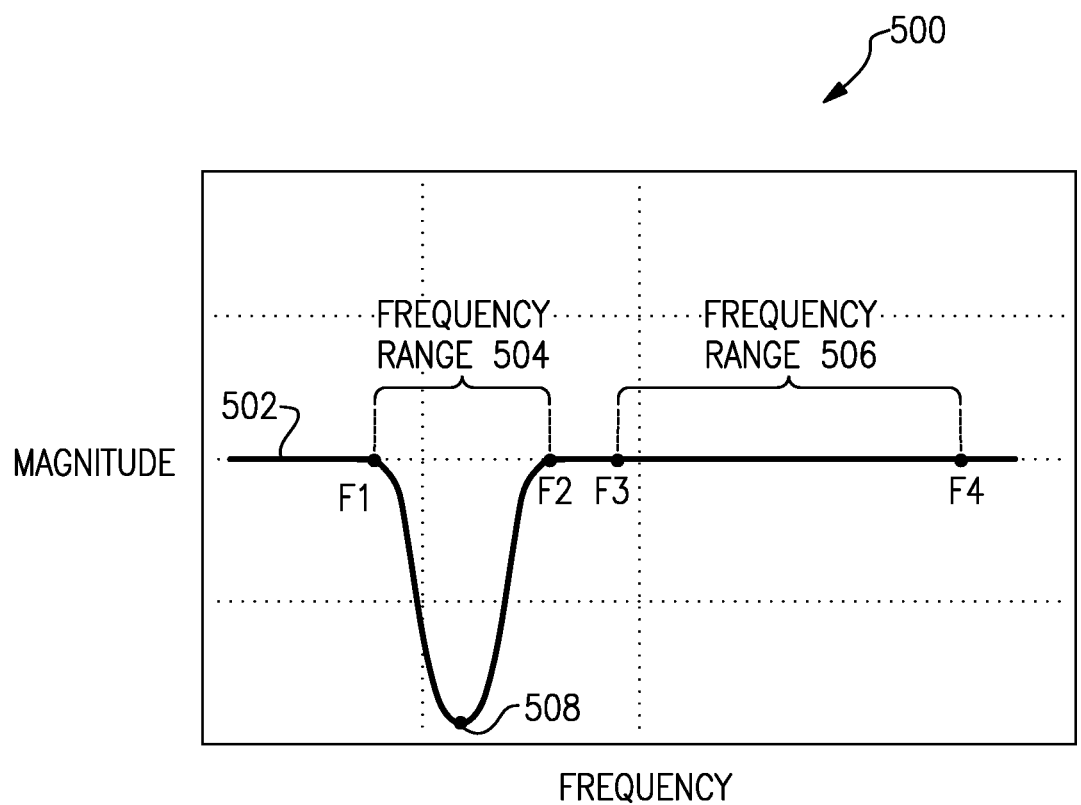
FIG. 5 illustrates a graph of an example frequency response for a notch filter in accordance with one or more embodiments.

FIG. 5 illustrates a graph 500 of an example frequency response for a notch filter in accordance with one or more embodiments. The graph 500 shows a frequency response line 502 with respect to magnitude on the Y axis and frequency on the X axis. The graph 500 can represent a frequency response for any of the notch filters discussed herein or any other notch filter. As shown by the frequency response line 502, the notch filter is configured to attenuate (e.g., reduce the magnitude of) signals that are within a frequency range 504 (about F1 to F2) and pass frequency components above and below the frequency range 504. The frequency range 504 is centered on a frequency 508, which is the frequency of the largest attenuation for the notch filter. In one non-limiting example, the notch filter is configured to implement an NS_07 specification and the frequency 508 is 775 MHz with the frequency range 504 including a particular number of Hz to each side of the frequency 508. For instance, the frequency range 504 can span a number of MHz, such as 2 MHz (from 774 MHz to 776 MHz), 3 MHz (from 773.5 MHz to 776.5 MHz), 6 MHz (from 772 MHz to 778 MHz), and so on. However, the frequency range 504 can be any frequency range.

In some embodiments, the notch filter associated with the graph 500 is implemented within the context of an emissions-suppression system that includes a transmit filter that is configured to support a frequency range 506. For example, the transmit filter can be implemented within a duplexer that is selectively coupled to the notch filter. Here, the notch filter can be implemented to attenuate signals within the frequency range 504 that is adjacent to the frequency range 506 (e.g., within a particular number of MHz) or directly adjacent to the frequency range 506 (e.g., frequency F2 corresponds to frequency F3). That is, the notch filter can remove frequency components that extend beyond the frequency range 506 (at least at one end of the frequency range 506, such as the F3 frequency end). In returning to the example above where the notch filter is configured to implement the NS_07 specification and the frequency 508 is 775 MHz, the frequency range 506 can be associated with Band 13. For example, the frequency range 506 can span from 777 MHz (frequency F3) to 787 MHz (frequency F4), and the transmit filter of the duplexer can be configured to pass signals within the frequency range 506.

Figure 6:
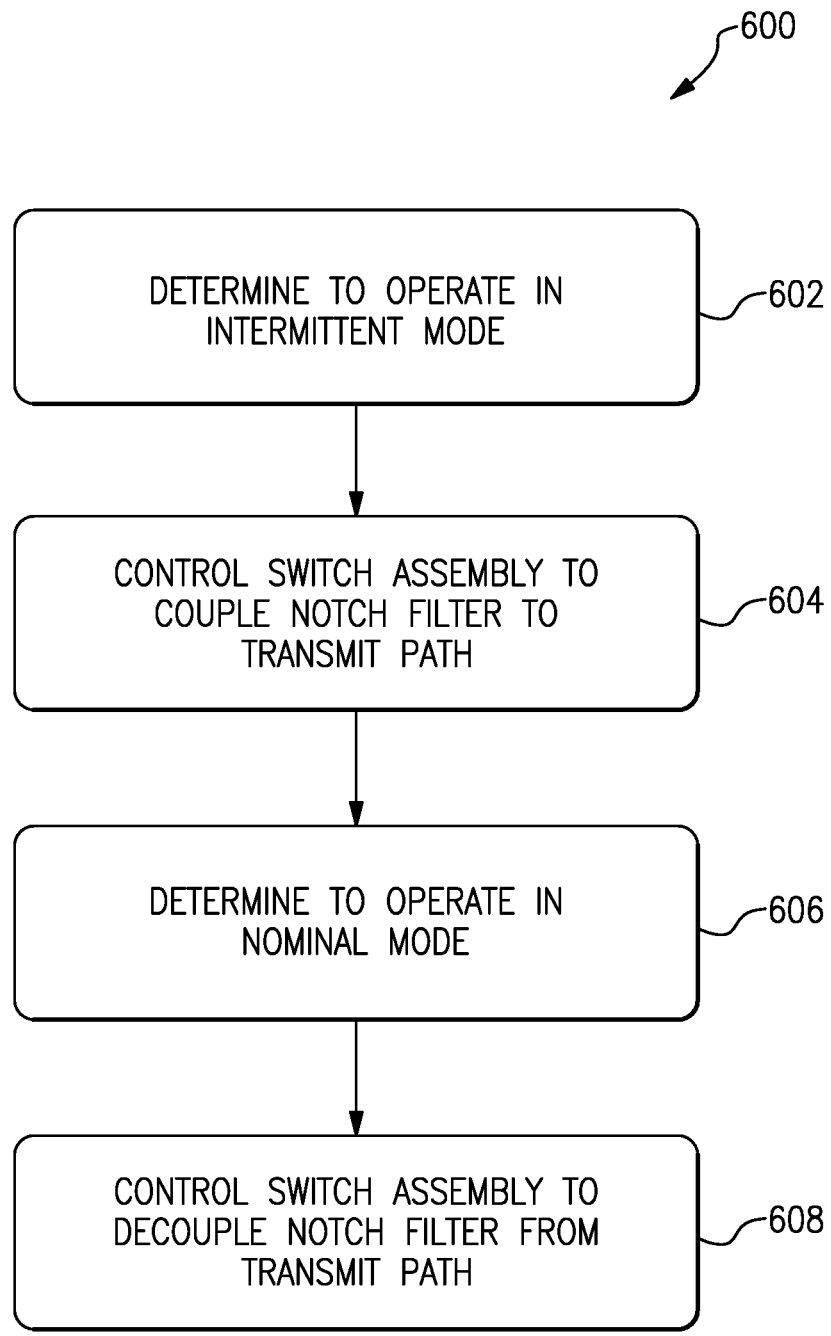
FIG. 6 illustrates an example flow diagram of a process of controlling an emissions-suppression system in accordance with one or more embodiments.

FIG. 6 illustrates an example flow diagram of a process 600 of controlling an emissions-suppression system in accordance with one or more embodiments. The process 600 can be implemented by any components of a radio-frequency device.

At 602, a controller can determine to operate in an intermittent mode. For example, a controller can determine to operate in an intermittent mode based on or in response to receiving a signal from a device within a cellular network to enter the intermittent mode (e.g., a network signaling case), determining that a radio-frequency device that implements the controller is within a particular geographical region or cellular operator, determining that the radio-frequency device is about to transmit a communication on a frequency band that is adjacent to a public safety frequency band, determining that another device within communication range to the radio-frequency device is using a public safety frequency band for communication, determining that the radio-frequency device is transmitting or about to transmit communications in adjacent frequency bands, determining that harmonic distortion or intermodulation distortion of a signal may interfere with another signal, determining that there is more than a threshold amount of interference in an environment where the radio-frequency device is located, and so on.

At 604, a switch assembly can be controlled to couple a notch filter to a transmit path. For example, based on or in response to determining to operate in an intermittent mode, a controller can send a control signal to a switch assembly to cause the switch assembly to couple a notch filter to a transmit path. Based on or in response to receiving the control signal, the switch assembly can control any number of switches associated with the switch assembly to couple the filter to the transmit path. The switch assembly is then operating in a filter state where the notch filter is implemented.

At 606, a controller can determine to operate in a nominal mode. For example, a controller can determine to operate in a nominal mode based on or in response to receiving a signal from a device within a cellular network to enter the nominal mode, determining that a radio-frequency device that implements the controller is outside a particular geographical region or cellular operator, determining that the radio-frequency device is no longer transmitting a communication on a frequency band that is adjacent to a public safety frequency band, determining that another device within communication range to the radio-frequency device is no longer using a public safety frequency band for communication, determining that the radio-frequency device is no longer transmitting in adjacent frequency bands, determining that harmonic distortion or intermodulation of a signal is no longer able to interfere with another signal, determining that there is less than a threshold amount of interference in an environment where the radio-frequency device is located, determining that the radio-frequency device has operated in an intermittent mode for more than a period of time, and so on.

At 608, a switch assembly can be controlled to decouple the notch filter from a transmit path. For example, based on or in response to determining to operate in a nominal mode, a controller can send a control signal to a switch assembly to cause the switch assembly to decouple a notch filter from a transmit path. Based on or in response to receiving the control signal, the switch assembly can control any number of switches associated with the switch assembly to decouple the filter from the transmit path. The switch assembly is then operating in a bypass state where the notch filter is bypassed.

Figure 7:
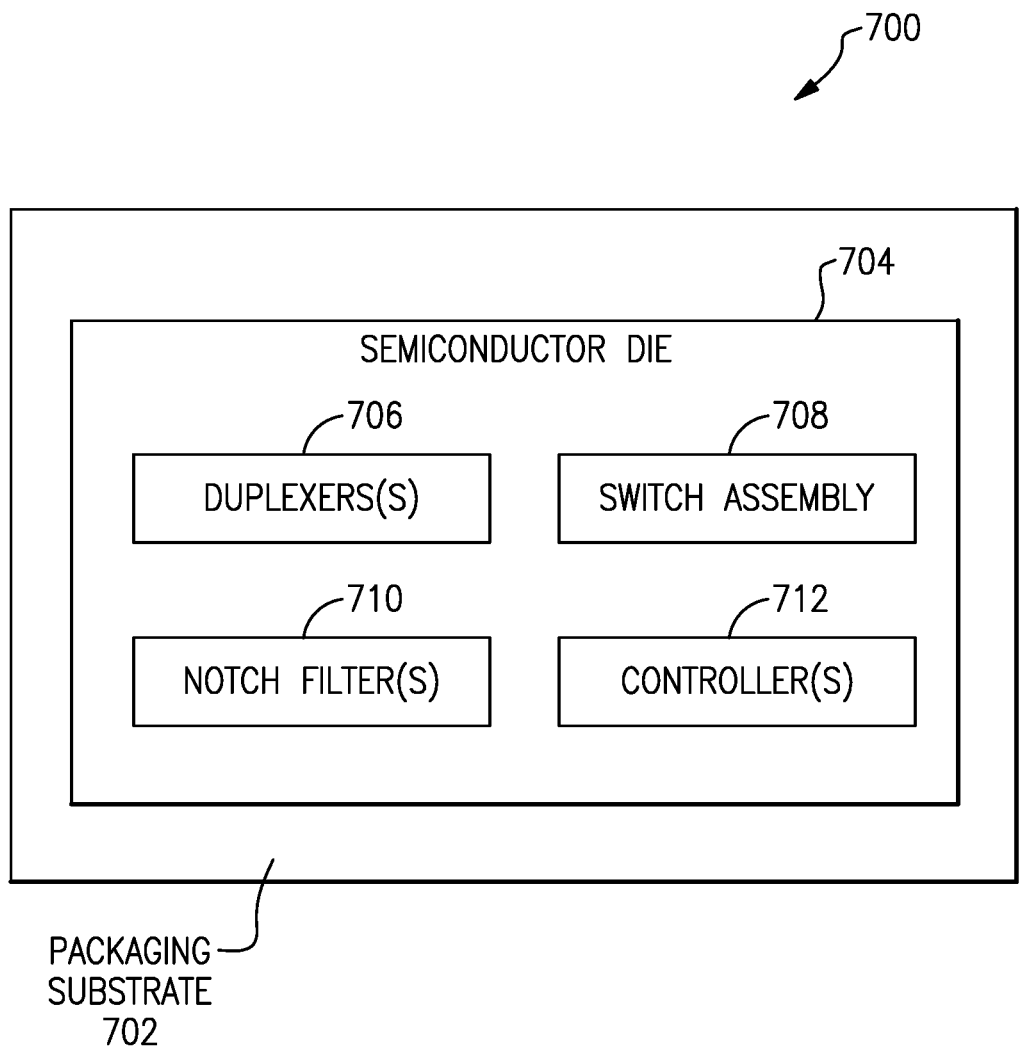
FIG. 7 illustrates an example radio-frequency module in accordance with one or more embodiments.

FIG. 7 illustrates an example radio-frequency module 700 in accordance with one or more embodiments. The radio-frequency module 700 includes a packaging substrate 702, a semiconductor die 704 mounted on the packaging substrate 702, a duplexer(s) 706 implemented on the semiconductor die 704, a switch assembly 708 implemented on the semiconductor die 704, a notch filter(s) 710 implemented on the semiconductor die 704, and a controller(s) 712 implemented on the semiconductor die 704. The duplexer 706 can include any of the duplexers discussed herein, the switch assembly 708 can include any of the switch assemblies discussed herein, the notch filter(s) 710 can include any of the notch filters discussed herein, and the controller(s) 710 can include any of the controllers discussed herein. Although the controller(s) 710 is illustrated as being implemented on the semiconductor die 704 and the packaging substrate 702, the controller(s) 710 can be implemented on a separate semiconductor die and/or packaging substrate. Similarly, the duplexer(s) 706, the switch assembly 708, and/or the notch filter(s) 710 can be implemented on separate semiconductor dies and/or packaging substrates. In some embodiments, the radio-frequency module 700 can be a front-end module (FEM), which can include a diversity module (e.g., a diversity-receive module) in some examples.

Figure 8:
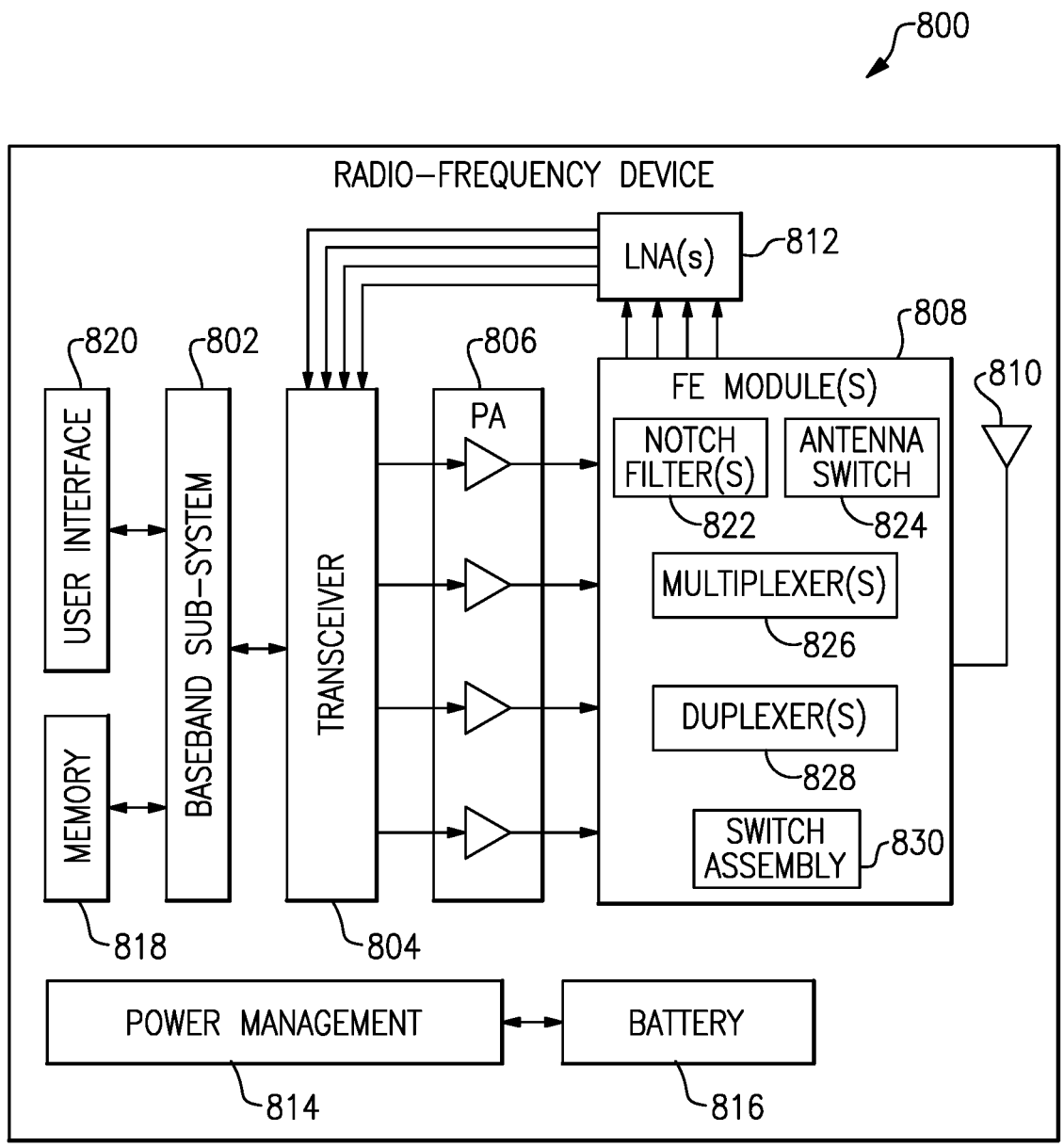
FIG. 8 illustrates an example radio-frequency device in accordance with one or more embodiments.

FIG. 8 illustrates an example radio-frequency device 800 in accordance with one or more embodiments. As shown, the radio-frequency device 800 can include a baseband sub-system 802, a transceiver 804, a power amplifier (PA) module 806, one or more front-end (FE) modules 808, one or more antennas 810, one or more low noise amplifiers (LNAs) 812, a power management system 814, a battery 816, a memory 818, and a user interface 820. The baseband sub-system 802, the transceiver 804, the PA module 806, the one or more FE modules 808, the one or more antennas 810, the one or more LNAs 812, the power management system 814, the battery 816, the memory 818, and/or the user interface 820 can be in communication with each other.

The baseband sub-system 802 can be connected to the user interface 820 to facilitate various input and/or output of voice and/or data provided to and/or received from a user. The baseband sub-system 802 can also be connected to the memory 818 that is configured to store data and/or instructions to facilitate operation of the radio-frequency device 800 and/or to provide storage of information for a user.

The transceiver 804 can generate radio-frequency (RF) signals for transmission and/or process incoming RF signals received from the one or more LNAs 812, the one or more antennas 810, and/or the one or more FE modules 808. The transceiver 804 can interact with the baseband sub-system 802 that is configured to provide conversion between data and/or voice signals suitable for a user and/or RF signals suitable for the transceiver 804. The transceiver 804 can also be connected to the power management system 814.

The PA module 806 can include a plurality of PAs that can provide an amplified RF signal to the one or more antennas 810, such as via one or more components of the one or more FE modules 808. Although four paths are shown as inputs and outputs to the PA module 806, and any number of input and/or output paths can be implemented.

The one or more FE modules 808 can include one or more notch filters 822, an antenna switch 824, one or more multiplexers 826, one or more duplexers 828, and/or a switch assembly 830. The antenna switch 824 can route a signal to and/or from the one or more antennas 810, such as to and/or from other components of the one or more FE modules 808. The antenna switch 824 can include any number of poles and/or throws. In some embodiments, the antenna switch 824 is implemented as part of a module. The one or more multiplexers 826 can include a diplexer, triplexer, quadplexer, or any N-plexer configured to implement multiplexing. In some examples of performing transmit operations, the one or more multiplexers 826 can be configured to combine/merge a plurality of signals onto a common path or port. Further, in some examples of performing receive operations, the one or more multiplexers 826 can be configured to split/sort a signal from a common path or port into a plurality of signals. The one or more duplexers 828 can allow transmit and/or receive operations to be performed simultaneously using a common antenna. In some embodiments, the one or more notch filters 822, the one or more duplexers 828, the switch assembly 830, and/or other components are implemented as part of an emissions-suppression circuit/system, such as any of the emissions-suppression circuit/systems discussed herein. In some embodiments, the one or more FE modules 808 can route one or more received signals to the one or more LNAs 812, which can be configured to amplify the one or more received signals. Although the one or more LNAs 812 and the PA module 806 are illustrated as separate components from the one or more FE modules 808, in some embodiments the one or more LNAs 812 and/or the PA module 806 are part of the one or more FE modules 808.

The one or more antennas 810 can include antennas for transmitting and/or receiving signals associated with a wide variety of frequencies and communications standards. In examples, the one or more antennas 810 support Multiple-Input Multiple-output (MIMO) communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity can refer to communications in which a particular antenna is selected for operation at a particular time. For example, a switch can be used to select a particular antenna from a group of antennas based on a variety of factors, such as an observed bit error rate and/or a signal strength indicator. In examples, the one or more antennas 810 can include a diversity antenna.

The power management system 814 can be configured to manage power for operation of the radio-frequency device 800. The power management system 814 can provide power to any number of components of the radio-frequency device 800. The power management system 814 can receive a battery voltage from the battery 816. The battery 816 can be any suitable battery for use in the radio-frequency device 800, including, for example, a lithium-ion battery.

The radio-frequency device 800 can communicate using a wide variety of communications technologies, including, but not limited to, 2G, 3G, 4G (including Long Term Evolution (LTE), LTE-Advanced, and LTE-Advanced Pro), 5G, Wireless Local Area Network (WLAN) (for instance, Wi-Fi), Wireless Personal Area Network (WPAN) (for instance, Bluetooth and ZigBee), Wireless Metropolitan Area Network (WMAN) (for instance, WiMax), and/or satellite-based radio navigation systems (for instance, Global Positioning System (GPS) technologies).

The radio-frequency device 800 can operate with beamforming in certain implementations. For example, the radio-frequency device 800 can include phase shifters having variable phase controlled by the transceiver 804. Additionally, the phase shifters can be controlled to provide beam formation and directivity for transmission and/or reception of signals using the one or more antennas 810. For example, in the context of signal transmission, the phases of the transmit signals provided to the one or more antennas 810 are controlled such that radiated signals from the one or more antennas 810 combine using constructive and destructive interference to generate an aggregate transmit signal exhibiting beam-like qualities with more signal strength propagating in a given direction. In the context of signal reception, the phases are controlled such that more signal energy is received when the signal is arriving to the one or more antennas 810 from a particular direction. In some embodiments, the one or more antennas 810 include one or more arrays of antenna elements to enhance beamforming.

In some embodiments, the radio-frequency device 800 supports carrier aggregation, thereby providing flexibility to increase peak data rates. Carrier aggregation can be used for both Frequency Division Duplexing (FDD) and Time Division Duplexing (TDD) and can be used to aggregate a plurality of carriers or channels. Carrier aggregation includes contiguous aggregation, in which contiguous carriers within the same operating frequency band are aggregated. Carrier aggregation can also be non-contiguous and can include carriers separated in frequency within a common band or in different bands.

The radio-frequency device 800 can include a wide variety of devices that are configured to communicate wirelessly. For example, the radio-frequency device 800 can include a cellular phone, a smart-phone, a hand-held wireless device with or without phone functionality, a wireless tablet, a smart appliance, a smart vehicle, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wearable device (e.g., a watch), a clock, etc.

The detailed description is set forth with reference to the accompanying figures. In the figures, the left-most digit(s) of a reference number identifies the figure in which the reference number first appears. The use of the same reference numbers in different figures indicates similar or identical items.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled" can refer to two or more elements that may be either directly connected or connected by way of one or more intermediate elements. Components discussed herein can be coupled in a variety of manners, such as through a conductive material. Additionally, the words "herein," "above," "below," and words of similar import, when used in this disclosure, shall refer to this application as a whole and not to any particular portions of this application. Where the context permits, words in the above Description using the singular or plural number may also include the plural or singular number respectively.

The above description of embodiments of the disclosure is not intended to be exhaustive or to limit the disclosure to the precise form disclosed above. While specific embodiments, and examples, are described above for illustrative purposes, various equivalent modifications are possible within the scope of the disclosure, as those skilled in the relevant art will recognize. For example, while processes or blocks can be presented in a given order, alternative embodiments can perform routines having steps, or employ systems having blocks, in a different order, and some processes or blocks can be deleted, moved, added, subdivided, combined, and/or modified. Each of these processes or blocks can be implemented in a variety of different ways. Also, while processes or blocks are at times shown as being performed in series, these processes or blocks can instead be performed in parallel or can be performed at different times.

The features described herein can be applied to other systems, not necessarily the system described above. The elements and acts of the various embodiments described above can be combined to provide further embodiments.

In some embodiments, the methods and/or systems discussed herein can be implemented at least in part by control circuitry and/or memory. For example, memory can store executable instructions that, when executed by control circuitry, cause the control circuitry to perform operations discussed herein. To illustrate, in some embodiments of the process 600 of FIG. 6, or other processes or architectures discussed herein, a device can include memory and control circuitry, wherein the memory can store executable instructions that, when executed by the control circuitry, cause the control circuitry to perform, at least in part, any of the operations of the process 600 of FIG. 6. Additionally, or alternatively, other methods and/or systems discussed herein can be implemented at least in part with control circuitry and memory storing executable instructions.

Control circuitry can include one or more processors, such as one or more central processing units (CPUs), one or more microprocessors, one or more graphics processing units (GPUs), one or more digital signal processors (DSPs), and/or other processing circuitry. Alternatively, or additionally, control circuitry can include one or more application specific integrated circuits (ASIC), one or more field-programmable gate arrays (FPGAs), one or more program-specific standard products (ASSPs), one or more complex programmable logic devices (CPLDs), and/or the like. Control circuitry can be configured to execute one or more instructions stored in memory to thereby perform one or more operations to implement various functionality discussed herein.

Memory can include any suitable or desirable type of computer-readable media. For example, computer-readable media can include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other types of data. Computer-readable media that may be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As used in certain contexts herein, computer-readable media may not generally include communication media, such as modulated data signals and carrier waves. As such, computer-readable media should generally be understood to refer to non-transitory media.

While some embodiments have been described, these embodiments have been presented by way of example only, and are not intended to limit the scope of the disclosure. Indeed, the methods and systems described herein can be embodied in a variety of other forms; furthermore, various omissions, substitutions and changes in the form of the methods and systems described herein can be made without departing from the spirit of the disclosure. Claims and their equivalents are intended to cover such forms or modifications as would fall within the scope and spirit of the disclosure.

What is claimed is:

1. An emissions-suppression circuit comprising:
a notch filter associated with a frequency range, the notch filter including a first end and a second end;
a first switch configured to, in a filter state, couple an input node to the first end of the notch filter and configured to, in a bypass state, couple the input node to an output node and bypass a second switch; and
the second switch disposed between the second end of the notch filter and the output node, the second switch is a single-pole-single-throw switch configured to selectively activate, the second switch configured to activate in the filter state.

2. The emissions-suppression circuit of claim 1 wherein the frequency range is associated with a public safety frequency band and the notch filter is configured to implement a specification associated with the public safety frequency band.

3. The emissions-suppression circuit of claim 1 wherein the frequency range is about 769 MHz to 775 MHz.

4. The emissions-suppression circuit of claim 1 further comprising a duplexer coupled to the output node and including a receive filter and a transmit filter that are associated with a same frequency band.

5. The emissions-suppression circuit of claim 1 wherein the first switch is a single-pole-double-throw switch.

6. The emissions-suppression circuit of claim 1 wherein the input node is coupled to a power amplifier and the output node is coupled to a duplexer.

7. A radio-frequency module comprising:
a packaging substrate;
a first filter disposed on the packaging substrate and configured to attenuate signals associated with one or more frequencies, the first filter including a first node and a second node;
a first switch disposed on the packaging substrate and configured to, in a filter state, route a signal through the first node of the first filter to the first filter and configured to, in a bypass state, route the signal to an output node while bypassing the first filter and a second switch; and
the second switch disposed on the packaging substrate between the second node of the first filter and the output node and configured to, in the filter state, route the signal from the second node of the first filter to the output node, the second switch is a single-pole-single-throw switch.

8. The radio-frequency module of claim 7 wherein the first switch is a single-pole-double-throw switch.

9. The radio-frequency module of claim 7 wherein the one or more frequencies are associated with a public safety frequency band.

10. The radio-frequency module of claim 7 wherein the first filter is configured to attenuate signals associated with a first frequency range and the radio-frequency module further includes a second filter dispose on the packaging substrate and configured to pass signals associated with a second frequency range that is adjacent to the first frequency range.

11. The radio-frequency module of claim 10 wherein the second filter is a transmit filter that is implemented in a duplexer, the duplexer including a receive filter that is associated with a same frequency band as the transmit filter.

12. A radio-frequency device comprising:
a power amplifier;
a notch filter;
a switch assembly coupled to the power amplifier and the notch filter, the switch assembly including a first switch and a second switch, the notch filter including a first node and a second node, the first switch being configured to, in a filter state, route a signal through the first node of the notch filter to the notch filter and configured to, in a bypass state, route the signal to an output node while bypassing the notch filter and the second switch, the second switch being configured to, in the filter state, route the signal from the second node of the notch filter to the output node, the second switch is a single-pole-single-throw switch;
a controller coupled to the switch assembly and configured to provide a control signal to the switch assembly; and
an antenna coupled to the switch assembly.

13. The radio-frequency device of claim 12 wherein the notch filter is associated with a public safety frequency band.

14. The radio-frequency device of claim 12 wherein the first switch is a single-pole-double-throw switch.

15. The radio-frequency device of claim 12 further comprising a duplexer coupled to the output node, the notch filter is associated with a first frequency range and the duplexer includes a filter that is associated with a second frequency range that is adjacent to the first frequency range.

16. The radio-frequency device of claim 15 wherein the filter of the duplexer is a transmit filter.

* * * * *